US012798024B2

(12) United States Patent
Liu et al.

(10) Patent No.: US 12,798,024 B2
(45) Date of Patent: Nov. 17, 2026

(54) MACHINING AND POSITIONING SYSTEM FOR AEROSPACE IRREGULAR PARTS AND DISCRETE INTELLIGENT PRODUCTION LINE THEREFOR

(71) Applicants: Qingdao University of Technology, Qingdao (CN); Qingdao Jimo Qingli intelligent manufacturing industry Research Institute, Qingdao (CN)

(72) Inventors: Dewei Liu, Qingdao (CN); Changhe Li, Qingdao (CN); Zongming Zhou, Qingdao (CN); Bo Liu, Kaduna (NG); Aiguo Qin, Qingdao (CN); Zongyi Liu, Qingdao (CN); Bingheng Lu, Qingdao (CN); Yanbin Zhang, Qingdao (CN); Min Yang, Qingdao (CN); Teng Gao, Qingdao (CN); Xiaoming Wang, Qingdao (CN); Dazhong Wang, Qingdao (CN); Minkai Chen, Qingdao (CN); Wenfeng Ding, Qingdao (CN); Qinglong An, Qingdao (CN)

(73) Assignees: Qingdao University of Technology, Qingdao (CN); Qingdao Jimo Qingli intelligent manufacturing industry Research Institute, Qingdao (CN)

( * ) Notice: Subject to any disclaimer, the term of this patent is extended or adjusted under 35 U.S.C. 154(b) by 396 days.

(21) Appl. No.: 18/587,980

(22) Filed: Feb. 27, 2024

(65) Prior Publication Data

US 2025/0144756 A1 May 8, 2025

(30) Foreign Application Priority Data

Nov. 3, 2023 (CN) ........................ 202311458825.3

(51) Int. Cl.
*B23Q 1/25* (2006.01)
*B23Q 3/06* (2006.01)

(52) U.S. Cl.
CPC ............... *B23Q 1/25* (2013.01); *B23Q 3/065* (2013.01)

(58) Field of Classification Search
CPC . B23Q 1/25; B23Q 3/06; B23Q 3/062; B23Q 3/065; B23Q 7/00; B23Q 3/00; B23Q 3/1554; B23Q 2240/00; B23Q 2240/005
See application file for complete search history.

(56) References Cited

U.S. PATENT DOCUMENTS

| | | | |
|---|---|---|---|
| 2022/0197246 A1 | 6/2022 | Cella et al. | |
| 2023/0135553 A1 | 5/2023 | Cella et al. | |
| 2023/0135882 A1 | 5/2023 | Cella et al. | |

FOREIGN PATENT DOCUMENTS

| | | | | |
|---|---|---|---|---|
| CN | 109483285 A | * | 3/2019 | ............. B23Q 3/065 |
| CN | 112621285 A | * | 4/2021 | ............... B23Q 1/25 |
| CN | 113824283 B | * | 2/2022 | ............. B23Q 3/062 |

* cited by examiner

*Primary Examiner* — C. A. Rivera

(57) ABSTRACT

A machining and positioning system for aerospace irregular parts and a discrete intelligent production line therefor are provided, which relates to the field of aerospace irregular part machining. In view of the problem that complex repeated positioning and poor positioning stability is required during the transportation and processing of aerospace irregular parts, a self-positioning device, a clamping device, and a support device are used to form a follow-up clamping and positioning system for the irregular part casing, reducing complex repeated positioning. The support block of the support device can fit to the inner wall of the casing, collect the support force using piezoelectric plates, and feedback and adjust the thrust of the support block based on the magnitude of the cutting radial force, maintaining (Continued)

stable support of the support block for the casing and meeting production needs.

9 Claims, 24 Drawing Sheets

MACHINING AND POSITIONING SYSTEM FOR AEROSPACE IRREGULAR PARTS AND DISCRETE INTELLIGENT PRODUCTION LINE THEREFOR

CROSS-REFERENCE TO RELATED APPLICATIONS

This application claims priority to Chinese Patent Application No. 202311458825.3 with a filing date of Nov. 3, 2023. The content of the aforementioned application, including any intervening amendments thereto, is incorporated herein by reference.

TECHNICAL FIELD

The present disclosure relates to the field of aerospace irregular part processing, in particular to a machining and positioning system for aerospace irregular parts and a discrete intelligent production line therefor.

BACKGROUND

The development of lightweight aerospace components has led to the emergence of irregular parts using integrated molding technology, such as combustion chamber casings and irregular cabins. Compared to traditional aerospace components, the machining of irregular parts mainly faces the following technical difficulties: (1) the structural characteristics of irregular parts are complex, so that traditional positioning and clamping methods are not effective; (2) the process flow of irregular parts is complex and cannot be completed in one processing unit for production; (3) the material of irregular parts is mostly aerospace aluminum alloy, and the structure is mostly thin-walled and cavity, which is prone to deformation during processing; (4) diversification of irregular parts makes it impossible to achieve flexible production.

In the face of the above technical difficulties, there are already relevant technologies publicly available, such as the Chinese patent application document with publication number CN115945927A, which discloses a combustion chamber casing machining fixture and clamping method based on floating support. The use of top support effectively improves the machining stiffness of the casing, and the use of floating support enables the entire fixture to be adaptively adjusted. However, this method can be adapted to smaller size variations of the casing, in addition, the support force of the support device on the casing cannot be adjusted, and the clamping and positioning of the fixture cannot be automated. The Chinese patent (public number: CN105817929B) discloses a rotary body casing fixture system and its application method, which adopts an suction clamping method and balances the cutting force of the tool through suction. However, this method lacks flexibility and cannot adapt to different sizes of rotary body casings. The Chinese patent (public number: CN104801935B) discloses a method for processing an aircraft aluminum alloy irregular cabin, in which an irregular cabin fixture is disclosed. However, the fixture lacks flexibility and excessive clamping force can easily cause deformation of the aluminum alloy.

Further, there are various public available technologies related to intelligent production lines in existing technologies. Although some solutions can achieve discrete production, their production lines have technical bottlenecks, making it difficult to achieve processing and production according to the optimal process route. Their fixtures are still not suitable for processing aerospace irregular parts. Some solutions can achieve flexible clamping and positioning similar to automotive wheel hubs, but the workpiece process cannot be adjusted according to the workpiece system, making it unsuitable for diversified and complex processing of aerospace irregular parts. When transferring and processing at multiple workstations, complex repeated positioning is required, which affects its production efficiency.

SUMMARY

The objective of the present disclosure is to provide a machining and positioning system for aerospace irregular parts and discrete intelligent production line therefor that addresses the shortcomings of existing technologies. The system utilizes a self-positioning device, a compression device, and a support device to form follow-up clamping and positioning for the irregular part casing, reducing complex repetitive positioning. The support block of the support device can fit to the inner wall of the casing, using piezoelectric plates to collect support force and feedback and adjust the thrust of the support block based on the magnitude of cutting radial force, maintaining stable support of the support block for the casing and meeting production needs.

The first aspect of the present disclosure is to provide a machining and positioning system for aerospace irregular parts is provided, including:

- a self-positioning device, wherein the self-positioning device includes three ball heads connected to a base and arranged around a axis of the base, the three ball heads are respectively connected to a rotating frame through connecting rods, and the rotating frame drives the three ball heads to move back and forth radially along the base to abut an inner wall of a casing;
- clamping devices, wherein a plurality of the clamping devices are arranged around the axis of the base, each clamping device includes a press head connected to an opening and closing mechanism and a translation mechanism, the translation mechanism drives the press head to move radially along the base, and the press head is capable to press against an outer wall of the casing;
- support devices, wherein the support device are connected to the base through a lifting device, and a plurality of the support devices are arranged around the axis of the base; each support device includes an action mechanism and a support block, an output end of the action mechanism is connected to the support block through a universal joint, and the support block is attached with a plurality of piezoelectric plates on a side of the inner wall of the casing.

Further, the base is provided with U-shaped positioning blocks that bear the casing, and three of the U-shaped positioning blocks are uniformly arranged around the axis of the base, upward along the circumferential direction, each ball head is located between two of the U-shaped positioning blocks, and the plurality of clamping devices are arranged between adjacent U-shaped positioning blocks.

Further, the self-positioning device is located radially along the base on an inner side of the support device; the lifting device is capable to drive the support device to reciprocate lifting along the axis of the base, and the support device is arranged above the self-positioning device through the lifting device.

Further, the rotating frame is triangular in shape, a center of the rotating frame is rotationally connected to a preset plain shaft on the base, a guide seat on the base maintains the movement direction of the ball heads, the connecting rods are connected to corner positions of the rotating frame, and the rotating frame is connected to a cylinder that drives the rotating frame to rotate around the plain shaft.

Further, the translation mechanism includes a mounting plate, a ball screw, a slider, and a servo motor; the slider is installed on the ball screw, an output end of the servo motor is connected to the ball screw, and the ball screw is rotationally installed on the mounting plate to drive the slider through rotation, so as to drive the press head and the opening and closing mechanism to move.

Further, the press head is installed on the slider through a rotating seat, the opening and closing mechanism is a cylinder, one end of the cylinder is connected to the slider, and the other end of the cylinder is connected to the press head.

Further, an adjusting hydraulic cylinder connected to the universal joint drives the universal joint to act, so as to change an orientation of the support blocks.

Further, the plurality of piezoelectric plates are arranged on support blocks at intervals to obtain stress at different contact positions with the casing and adjust support force to counteract cutting radial force.

The second aspect of the present disclosure is to provide a machining and positioning system for aerospace irregular parts, including:

- a base, wherein the base includes an upper layer and a lower layer arranged apart; and a mounting plate is located between the upper layer and the lower layer and is connected to a bottom surface of the upper layer through a telescopic mechanism;
- a floating mounting plate, wherein the floating mounting plate is trapezoidal in shape, with cylinders installed at intervals along a top edge of the floating mounting; output ends of the cylinders are provided with suction cups that are capable to abut and adsorb an inner wall of an irregular cabin; a bottom surface of the floating mounting plate is connected to the mounting plate after passing through the upper layer of the base through a plain rod;
- a mounting block, wherein the mounting block is arranged between the upper layer of the base and the floating mounting plate, and is connected with support nails that abut against the irregular cabin.

Further, the support nails are arranged around the floating mounting plate, and the support nails are connected to the inner wall of the irregular cabin and perform six-point positioning on the irregular cabin.

Further, the output ends of the cylinders are connected to the suction cups through ball joints, and the telescopic mechanism drives the floating mounting plate to apply a force perpendicular to the base on the irregular cabin through the suction cups.

Further, the telescopic mechanism includes a main cylinder and an telescopic member; the main cylinder is connected to the upper layer of the base and a mounting plate, and an outer of the telescopic member is sleeved with a spring; the main cylinder and the spring work together to change a distance between the mounting plate and the upper layer to adjust a relative position of the floating mounting plate and the upper layer.

The third aspect of the present disclosure is to provide a discrete intelligent production line, which uses the machining and positioning system for aerospace irregular parts as mentioned in the first aspect;

The discrete intelligent production line further includes machining centers, wherein a plurality of the machining centers are arranged in a rectangular shape, and the machining and positioning system for aerospace irregular parts is installed on the machining centers; a ground rail robot is installed in a middle position of the machining centers, and the circular conveyor platform is installed at one end of the ground rail robot; a machine vision recognition device is arranged at a loading position of the circular conveyor platform, and two unloading conveyor platforms are installed and symmetrically arranged at an end of the ground rail robot; a centralized tool changing system is located above a machining center area, and a micro lubrication centralized supply system is connected to each machining center.

Further, the ground rail robot is provided with a temporary storage table that follows its movement, when a workpiece to be loaded meets to a machining process route and the machining centers are in a machining state, the ground rail robot transfers the workpiece to be loaded to the temporary storage table waiting for loading.

Further, the centralized tool changing system includes a three-axis conveying device, a tool changing robot, and a cutter head; the tool changing robot is installed on a support through the three-axis conveying device, and the cutter head is installed on the support through a lifting mechanism to adjust a vertical height of the cutter head relative to the support; and an end of the tool changing robot is connected to a dual station tool changing arm to clamp the tools to be replaced and replace the tools.

Compared with existing technology, the advantages and positive effects of the present disclosure are shown as below:

(1) In view of the current problem that complex and repeated positioning and poor positioning stability are required during the transportation and processing of aerospace irregular parts, a self-positioning device, a clamping device, and a support device are used to form a follow-up clamping and positioning of the irregular part casing, reducing complex repetitive positioning. The support block of the support device can fit the inner wall of the casing, and the support force is collected by piezoelectric plates and feedback is adjusted based on the magnitude of the cutting radial force to adjust the thrust of the support block, maintain stable support of the support block for the casing to meet production needs.

(2) The discrete intelligent production line includes a circular conveyor, a machine vision recognition system, and a universal pallet, achieving the discrete intelligent production of diverse and complex components. It further includes a centralized tool changing system to achieve centralized management and replacement of tools, and a micro lubrication centralized supply system for reducing the use of cutting fluid and achieving centralized supply and control of micro lubricating oil.

(3) The positioning and processing system of the casing is highly flexible. The self-positioning of workpieces with different diameters can be achieved through the slider-crank mechanism, and the clamping of workpieces with different diameters can be achieved by the slider-crank mechanism which is driven by a displacement device. By using a lifting device and a hydraulic cylinder to drive, the support device provides all-round support for the inner surface of the workpiece, improving the stiffness of the workpiece at a certain height from the positioning reference plane, and achieving measurement and feedback adjustment of the supporting force, so that the supporting force is equal to the radial cutting force.

(4) The irregular cabin machining system effectively improves the positioning and machining accuracy, and achieves workpiece positioning through the six-point positioning principle. The cylinder drives the suction cup to adsorb the inner surface of the workpiece, and the cylinder drives the floating mounting plate to make the suction cup generate frictional force perpendicular to the main positioning surface on the inner surface of the workpiece, achieving flexible clamping.

BRIEF DESCRIPTION OF THE DRAWINGS

The accompanying drawings of the specification, which form a part of the present disclosure, are used to provide a further understanding of the present disclosure. The illustrative embodiments and their illustrations of the present disclosure are used to illustrate the present disclosure and do not constitute an improper limitation of the present disclosure.

Figure 1:
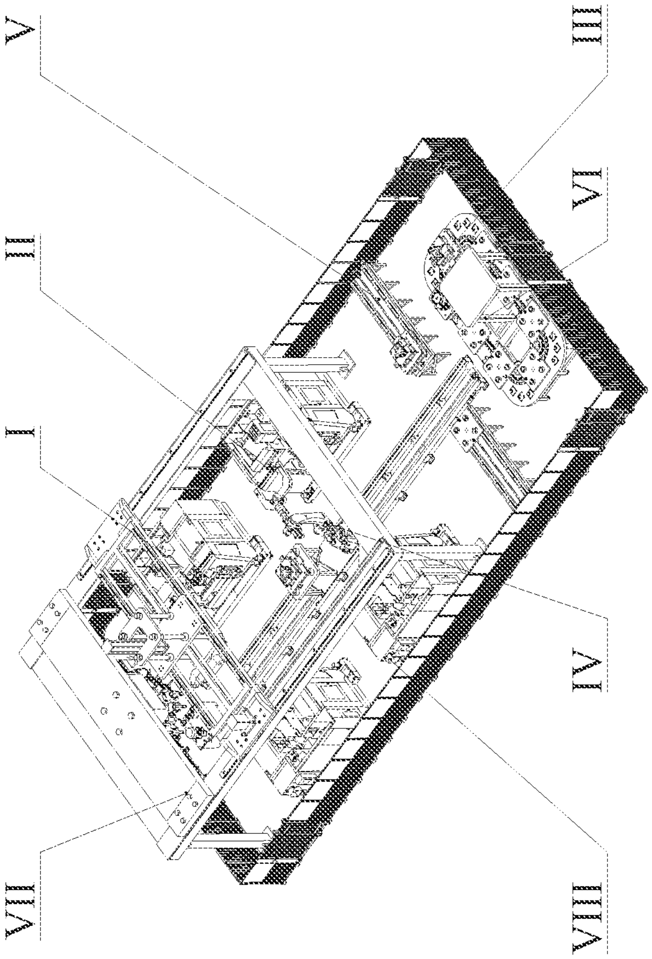
FIG. 1 is an axonometric diagram of a discrete intelligent production line for aerospace irregular parts in Embodiment 3 of the present disclosure.

The reference numbers in the drawings: machining and positioning system I, machining center II, circular conveyor platform III, ground rail robot IV, unloading conveyor platform V, machine vision recognition device VI, centralized tool changing system VII, and micro lubrication centralized supply system VIII;

casing IX-1, casing follow-up fixture I-1, universal pallet I-3, base I-1-1, U-shaped positioning block I-1-2, clamping device I-1-3, self-positioning device I-1-4, support device I-1-5, lifting device I-1-6; groove I-1-1-1; cylinder I-1-4-1, rotating frame I-1-4-2, connecting piece I-1-4-3, connecting rod I-1-4-4, guide seat I-1-4-5, ball head I-1-4-6; bottom mounting platform I-1-6-1, lifting platform I-1-6-2, top mounting platform I-1-6-3, ball screw I-1-6-4, servo motor I-1-6-5, guide rod I-1-6-6; servo motor I-1-3-1, mounting plate I-1-3-2, slider I-1-3-3, press head I-1-3-4, cylinder I-1-3-5, ball screw I-1-3-6; rotating seat I-1-3-7; piezoelectric plate I-1-5-1, flange I-1-5-2, top hydraulic cylinder I-1-5-10, guide seat I-1-5-4, top rod I-1-5-5, main hydraulic cylinder I-1-5-6, servo motor I-1-5-7, slider I-1-5-8, ball screw I-1-5-9, mounting plate I-1-5-10, side hydraulic cylinder I-1-11, and support block I-1-5-12;

irregular cabin IX-2, irregular cabin follow-up fixture I-2, universal pallet I-3, base I-2-1, floating mounting plate I-2-2, mounting block I-2-3, support nail I-2-4, cylinder I-2-5, suction cup I-2-6, spring I-2-7, mounting plate I-2-8, main cylinder I-2-9, flange I-2-10, and shaft sleeve I-2-11;

support VII-1, crossbeam mounting plate VII-2, cutter head VII-3, X-axis conveying device VII-4, Y-axis conveying device VII-5, Z-axis conveying device VII-6, tool changing robot VII-7, hydraulic cylinder VII-8, servo motor VII-9, linear guide rail VII-10, rack VI-11, floating mounting plate VII-12, gear VII-13, rolling support VII-14, rack mounting plate VII-15, and slider VII-16;

centralized oil supply tank VIII-1, micro lubrication device VIII-2; tank VIII-1-1, tank cover VIII-1-2, solenoid valve VIII-1-3, liquid level controller VIII-1-6, hydraulic oil pump specific motor VIII-1-4, hydraulic oil pump VIII-1-5; nozzle VIII-2-1, pneumatic frequency generator VIII-2-2, solenoid valve VIII-2-3, three-way VIII-2-4, micro pneumatic pump VIII-2-5, oil cup VIII-2-6, liquid level sensor VIII-2-7, and tank VIII-2-8.

DETAILED DESCRIPTION OF THE EMBODIMENTS

Embodiment 1

In a typical embodiment of the present disclosure, as shown in FIG. 12 to FIG. 21, a machining and positioning system for aerospace irregular parts is provided.

In view of the problem that complex repetitive positioning and poor positioning stability are required for the transportation and processing of aerospace irregular parts, a machining and positioning system for aerospace irregular parts is provided, especially for the machining positioning of the casing. A detailed explanation will be provided in conjunction with the attached diagram as below.

Figure 12:
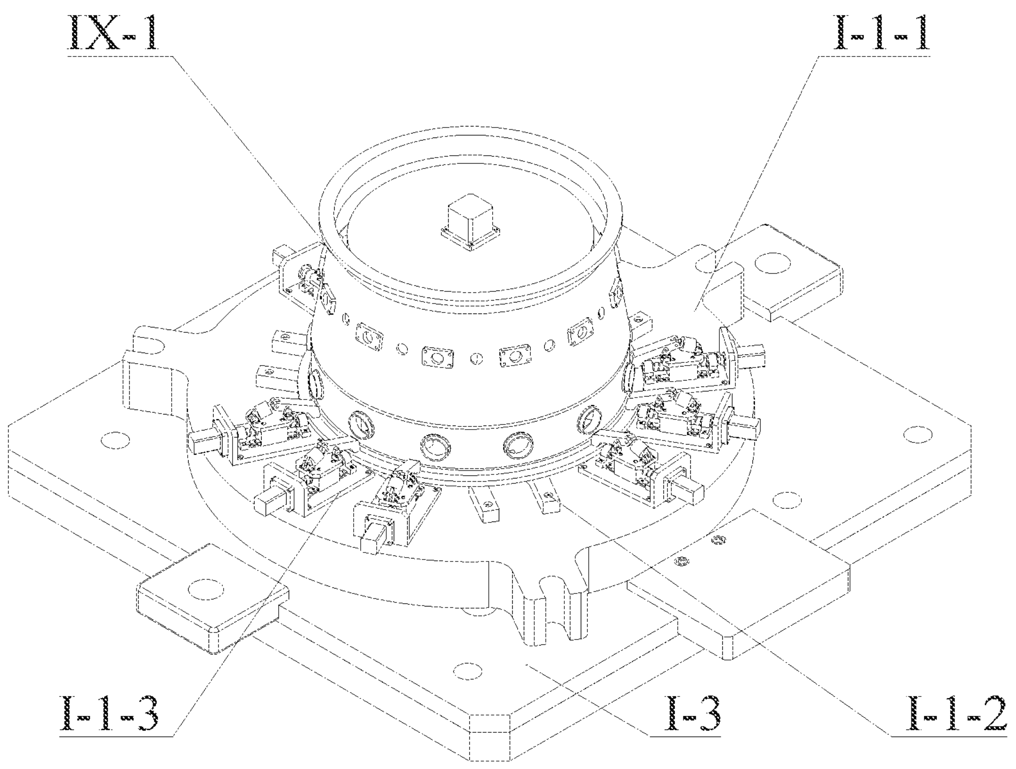
FIG. 12 is an axonometric diagram of a follow-up fixture for aerospace irregular parts in Embodiment 1 and Embodiment 3 of the present disclosure.
Figure 13:
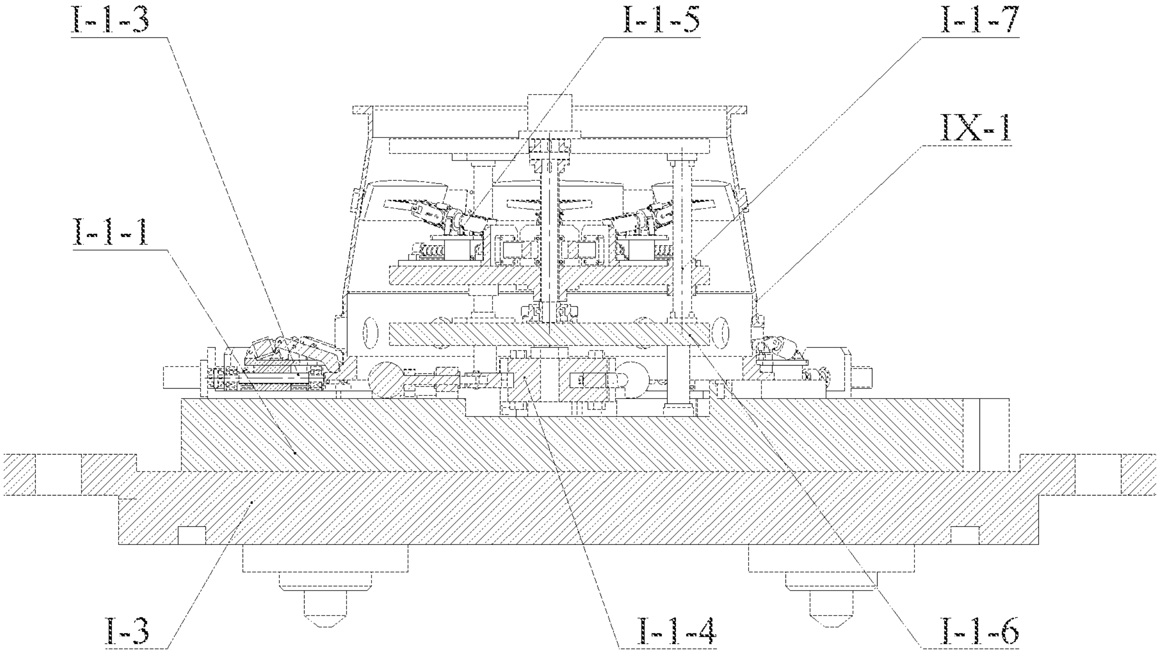
FIG. 13 is a sectional view of the follow-up fixture for aerospace irregular parts in Embodiment 1 and Embodiment 3 of the present disclosure.

As shown in FIG. 12 and FIG. 13, there is a machining and positioning system for an aerospace engine combustion chamber casing. The casing VIII-1 is a typical thin-walled circular part that requires one clamping process to achieve rough machining and precision machining of the outer circular end face.

A machining and positioning system for an aerospace engine combustion chamber casing mainly consists of a zero-point positioning system and a casing follow fixture I-1. The zero-point positioning system is installed in machining center II to ensure that the relative zero-point of the parts remains unchanged during transportation, and is used for clamping the follow fixture I-1. Universal pallets ensure unified transportation and positioning clamping methods for parts.

The follow fixture I-1 of the casing includes: an universal pallet I-3, a base I-1-1, U-shaped positioning blocks I-1-2, clamping devices I-1-3, a self-positioning device I-1-4, a support device I-1-5, and a lifting device I-1-6. Wherein three U-shaped positioning blocks I-1-2 are installed on the base I-1-1 in a circumferential distribution, and the angle of the connecting lines between every two U-shaped positioning blocks I-1-2 and the center of the base I-1-1 is 120°, which limits the degree of freedom of the workpiece. In the present embodiment, there are a total of 9 clamping devices I-1-3, but should not be regarded 9 clamping devices in the present embodiment as a limitation, which are installed on the base in a circumferential distribution to achieve clamping of the workpiece. The self-positioning device I-1-4 is installed at the center position of the base I-1-1 to limit the degree of freedom of the workpiece. The lifting device I-1-6 is installed at the center position of the base I-1-1 to achieve height adjustment of the support device I-1-5. The support device I-1-5 is installed on the lifting platform of the lifting device I-1-6 to increase the stiffness of the workpiece at a certain height from the positioning reference plane, so as to prevent deformation during the workpiece processing.

Figure 14:
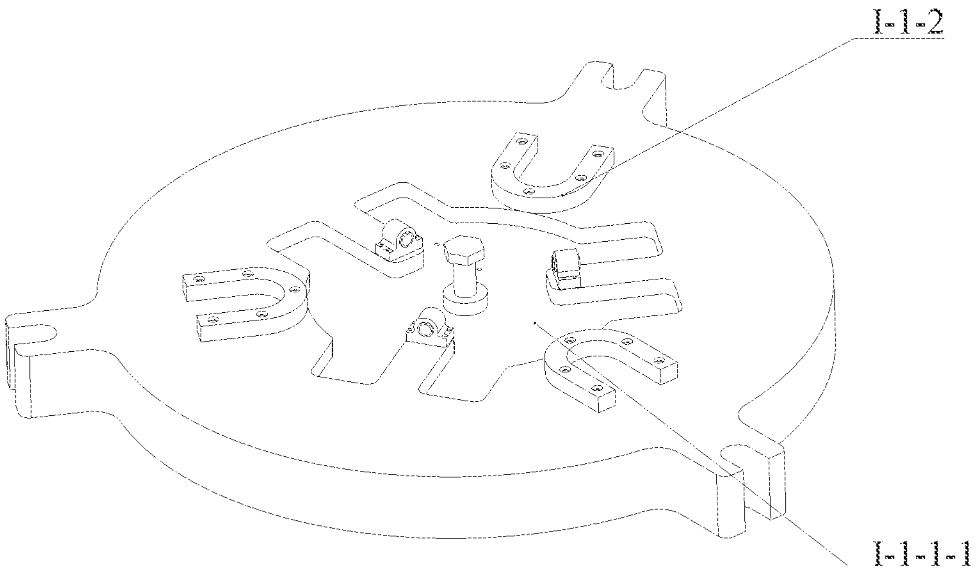
FIG. 14 is an axonometric diagram of the base of the follow-up fixture for aerospace irregular parts in Embodiment 1 and Embodiment 3 of the present disclosure.

As shown in FIG. 14, the base I-1-1-1 is circular in shape, with mounting holes fixed to the universal pallet I-3. A special-shaped groove I-1-1-1 is set in the center of the base I-1-1-1 for installing the self-positioning device I-1-4. Multiple mounting holes for clamping devices are installed on the surface of base I-1-1.

Figure 15:
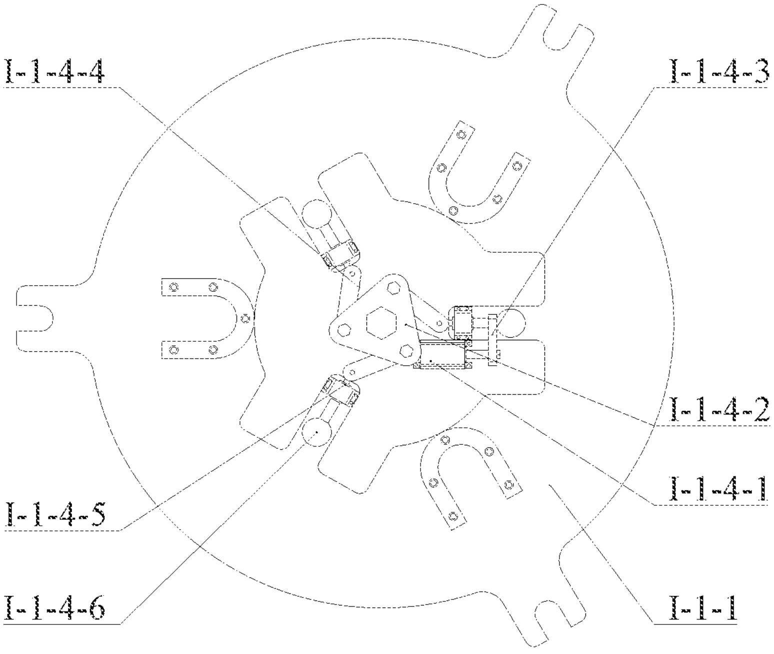
FIG. 15 is an axonometric diagram of a self-positioning device of the follow-up fixture for aerospace irregular parts in Embodiment 1 and Embodiment 3 of the present disclosure.

As shown in FIG. 15, the self-positioning device I-1-4 includes a cylinder I-1-4-1, a rotating frame I-1-4-2, a connecting piece I-1-4-3, a connecting rod I-1-4-4, a guide seat I-1-4-5, and a ball head I-1-4-6. Wherein the rotating frame I-1-4-2 is capable to rotate along the plain shaft installed at the center of the base I-1-1. The ball head I-1-4-6 is connected to the rotating frame through the connecting rod I-1-4-4, and expands and contracts along a straight line through the guide seat I-1-4-5 installed on the base I-1-1. The cylinder I-1-4-1 is installed in the groove of the base I-1-1, and the piston rod of the cylinder I-1-4-1 is fixedly connected to the ball head I-1-4-6 through the connecting piece I-1-4-3. At this time, the cylinder I-1-4-1, the ball head I-1-4-6, the connecting rod I-1-4-4, and the rotating frame I-1-4-2 form a slider-crank mechanism. The cylinder I-1-4-1 drives the expansion and contraction of a single ball head I-1-4-6 to achieve synchronous expansion and contraction control of three ball heads I-1-4-6.

The positioning of the follow fixture I-1 for the casing is composed of the U-shaped positioning blocks I-1-2 and the self-positioning device I-1-4. Specifically, the large diameter end face of the casing V-1 serves as the main positioning base, and the U-shaped positioning block restricts the movement of the workpiece along the Z-axis direction and flipping of the workpiece along the X-axis and the Y-axis. The three ball heads I-1-4-6 of the casing are act as a short arbor with adaptive diameter changes, limiting the movement of the workpiece along the X-axis and the Y-axis. By this way, the workpiece is limited to five degrees of freedom, which is an incomplete positioning method.

Figure 16:
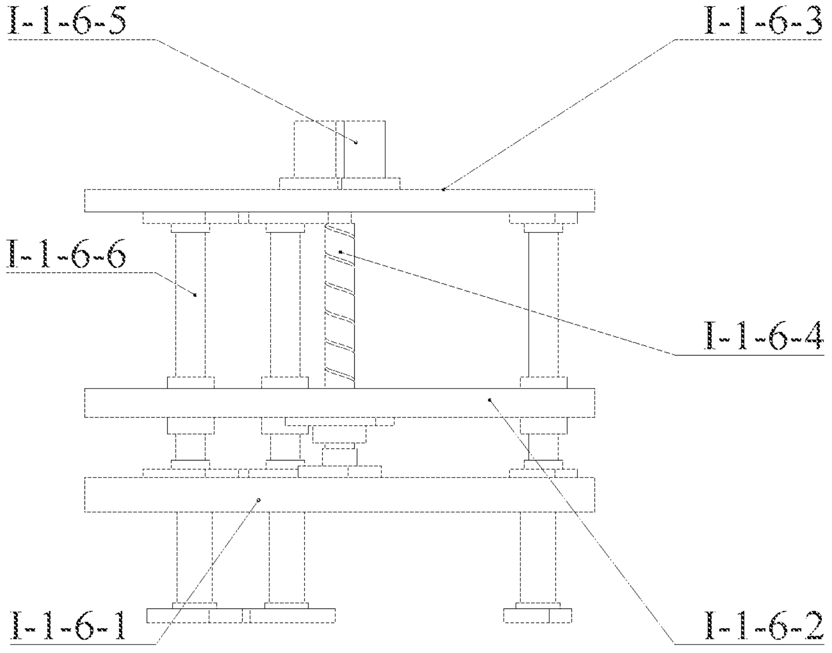
FIG. 16 is an axonometric diagram of the lifting device of the follow-up fixture for aerospace irregular parts in Embodiment 1 and Embodiment 3 of the present disclosure.

As shown in FIG. 16, the lifting device includes: a bottom mounting platform I-1-6-1, a lifting platform I-1-6-2, a top mounting platform I-1-6-3, a ball screw I-1-6-4, a servo motor I-1-6-5, and guide rods I-1-6-6. The bottom mounting platform I-1-6-1 is fixedly installed in the groove of the base I-1-1 along the central axis of the base. The top mounting platform I-1-6-3 and the bottom mounting platform I-1-6-1 are fixedly connected through the guide rods I-1-6-6. The upper end of the top mounting platform I-1-6-3 is equipped with a servo motor I-1-6-5, which is used to drive the ball screw I-1-6-4 between the bottom mounting platform I-1-6-1 and the top mounting platform I-1-6-3. The lifting platform I-1-6-2 is installed on the slider of the ball screw I-1-6-4, and achieves linear guidance through guide rods I-1-6-6, thereby moving up and down.

Figure 17:
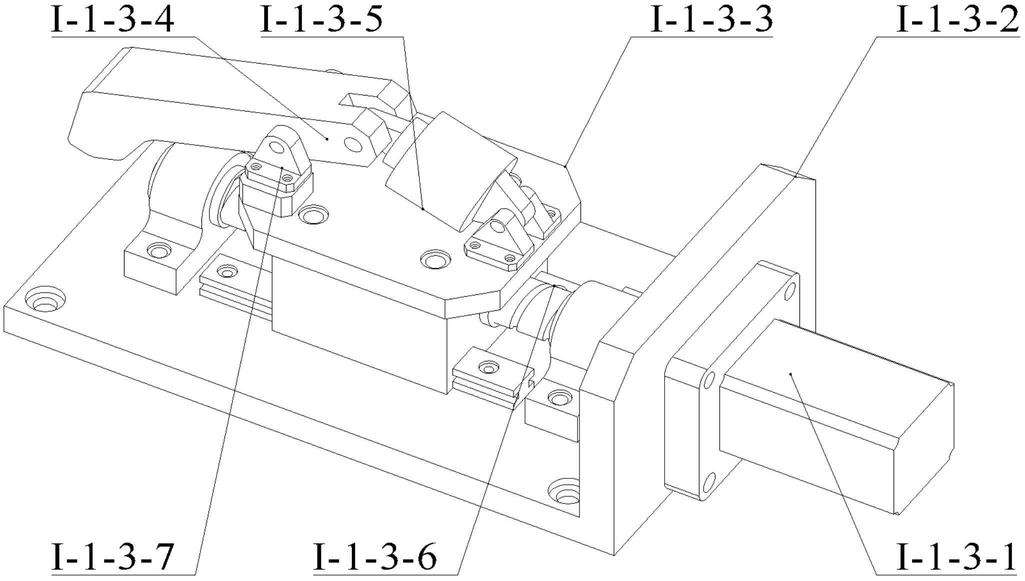
FIG. 17 is an axonometric diagram of the clamping device of the follow-up fixture for aerospace irregular parts in Embodiment 1 and Embodiment 3 of the present disclosure.
Figure 18:
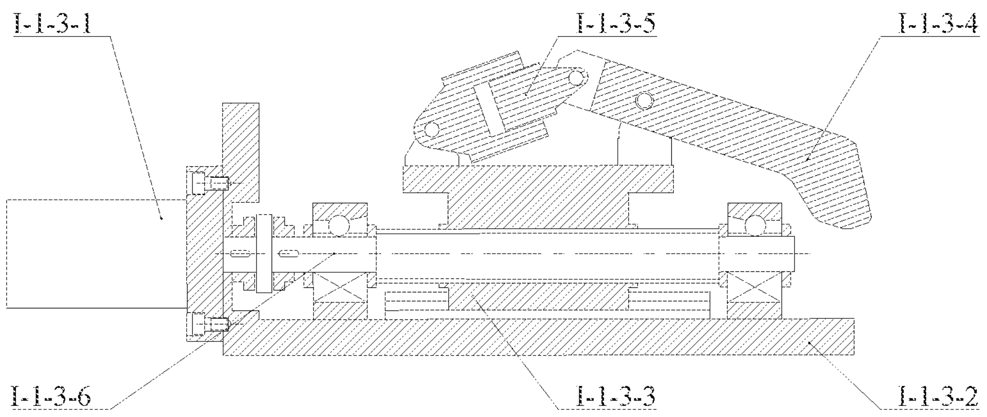
FIG. 18 is a sectional view of the clamping device of the follow-up fixture for aerospace irregular parts in Embodiment 1 and Embodiment 3 of the present disclosure.

As shown in FIG. 17 and FIG. 18, the clamping device I-1-3 includes a servo motor I-1-3-1, a mounting plate I-1-3-2, a slider I-1-3-3, a press head I-1-3-4, a cylinder I-1-3-5, a ball screw I-1-3-6, and a rotating seat I-1-3-7. The servo motor I-1-3-1 and the ball screw I-1-3-6 are installed on the mounting plate I-1-3-2. The cylinder I-1-3-5 and the press head I-1-3-4 are installed on the slider I-1-3-3 of the ball screw I-1-3-6 through the rotating seat I-1-3-7. The cylinder body of the cylinder I-1-3-4 is connected to the slider I-1-3-3 through hinges, and the piston rod of the cylinder I-1-3-4 is connected to the press head I-1-3-4 through hinges. Similarly, the press head I-1-3-4 is hinged to the slider. The servo motor I-1-3-1 drives the ball screw I-1-3-6 to adjust the clamping range of the press head I-1-3-4 to adapt to workpieces of different diameter sizes.

Figure 19:
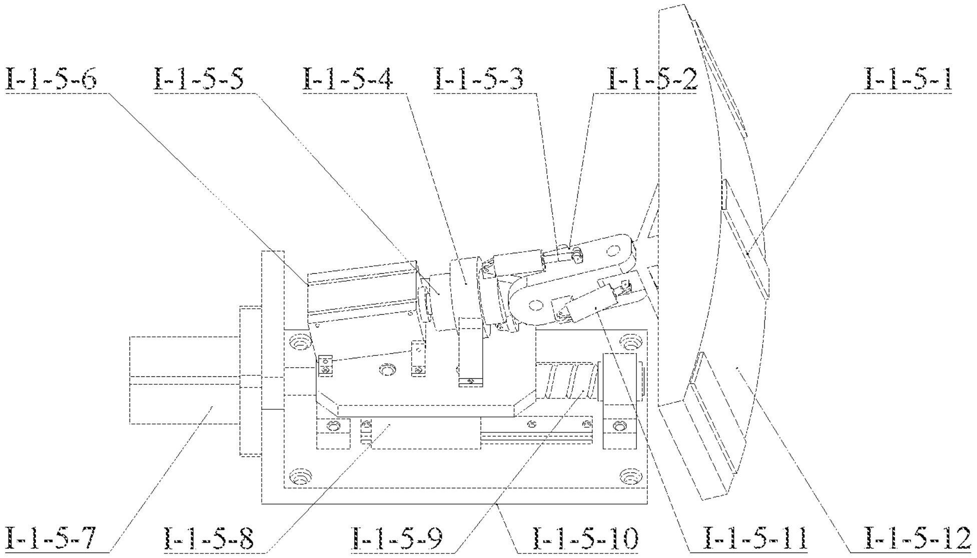
FIG. 19 is an axonometric diagram of the support device for the follow-up fixture of aerospace irregular parts in Embodiment 1 and Embodiment 3 of the present disclosure.
Figure 20:
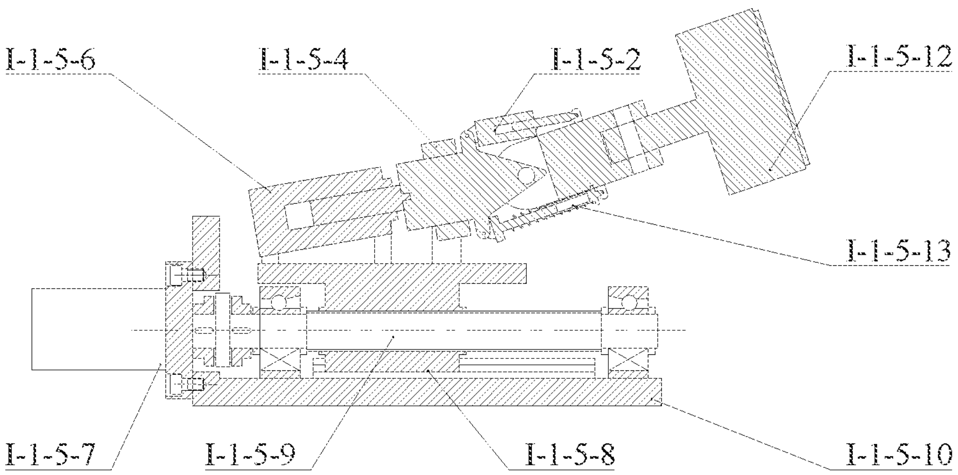
FIG. 20 is a sectional view of the support device of the follow-up fixture for aerospace irregular parts in Embodiment 1 and Embodiment 3 of the present disclosure.

As shown in FIG. 19 and FIG. 20, the support device I-1-5 includes: piezoelectric plates I-1-5-1, a flange I-1-5-2, a top hydraulic cylinder I-1-5-3, a guide seat I-1-5-4, a top rod I-1-5-5, a main hydraulic cylinder I-1-5-6, a servo motor I-1-5-7, a slider I-1-5-8, a ball screw I-1-5-9, a mounting plate I-1-5-10, a side hydraulic cylinder I-1-11, and a support block I-1-5-12. Wherein the connection manners of the mounting plate I-1-5-10, the servo motor I-1-5-7, the ball screw I-1-5-9, and the slider I-1-5-8 are the same as that of the clamping device I-1-3. The main hydraulic cylinder I-1-5-6 is fixedly connected to the slider I-1-5-8, and there is a certain angle between the central axis of the main hydraulic cylinder I-1-5-6 and the upper surface of the slider. The piston rod of the main hydraulic cylinder I-1-5-6 is fixedly connected to the top rod I-1-5-5, and the guide seat I-1-5-4 moves the top rod I-1-5-5 in a straight line. The top rod I-1-5-6 is hinged with the flange I-1-5-2, and the top hydraulic cylinder I-1-5-3 is installed on the upper end face of flange I-1-5-2. The cylinder body of the top hydraulic cylinder I-1-5-3 is hinged with the top rod I-1-5-5, and the piston rod is hinged with the flange I-1-5-2. The flange I-1-5-2 is hinged with the support block I-1-5-12, and the hydraulic cylinder I-1-5-11 is installed on the side of the flange I-1-5-2. The cylinder body of the hydraulic cylinder I-1-5-11 is hinged with the flange I-1-5-2, and the piston rod is hinged with the support block I-1-5-12.

Specifically, the support block has four degrees of freedom. The movement distance of the slider I-1-5-8 is adjusted based on the cross-sectional radius of the workpiece at a certain height from the positioning reference plane. The main hydraulic cylinder I-1-5-6 pushes the top rod I-1-5-4 to make the support block I-1-5-12 attach to the inner surface of the workpiece. The surface of the support block I-1-5-12 is equipped with piezoelectric plates I-1-5-1 to collect support force. The thrust of the main hydraulic cylinder I-1-5-6 is adjusted according to the magnitude of the cutting radial force, thereby adjusting the support force to be equal to the cutting radial force. In addition, since the curvature of the support block may not be equal to the curvature of the inner surface of the workpiece, some areas of the workpiece may not be effectively supported. Thus, the support angle of the support block can be adjusted by the top hydraulic cylinder I-1-5-3 and the side hydraulic cylinder I-1-5-11 according to the cutting range of the tool, so that all parts of the support block can provide support to the surface of the workpiece.

Figure 21:
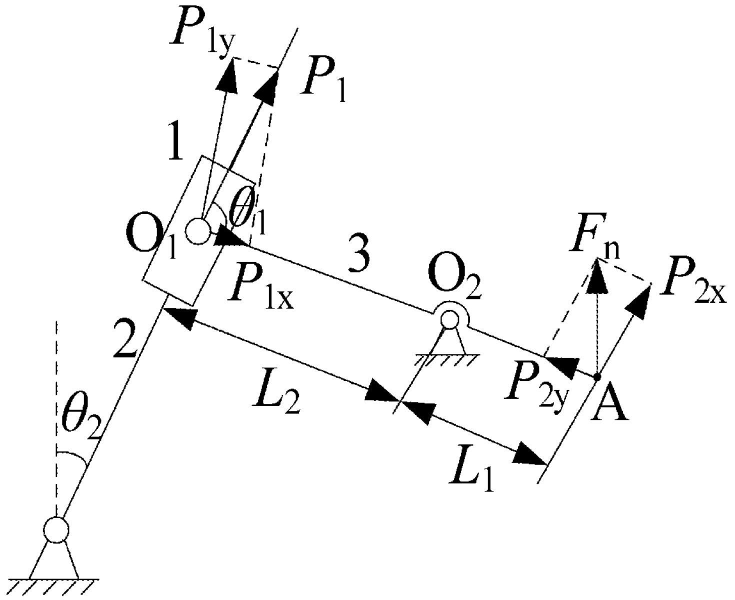
FIG. 21 is a schematic diagram of the clamping mechanism of the follow-up fixture for aerospace irregular parts in Embodiment 1 and Embodiment 3 of the present disclosure.

Clamping Reliability Analysis:

As shown in FIG. 21, the schematic diagram and force analysis of the clamping device I-1-4 are presented. Assuming that the tangential contact force between the workpiece and the fixture components does not slide relative to each other during the milling process is M, and the position of the workpiece relative to the fixture does not change during the machining process, then:

$$F_{n,min} = \frac{M_{max}}{\mu} - G \tag{1}$$

In the formula, $F_{n,min}$ is the minimum clamping force, N; $M_{max}$ is the maximum tangential contact force, N; G is the gravity of the workpiece, N; μ is the coefficient of friction;

According to the torque balance at point $O_2$, it can be inferred that:

$$P_{1y}L_2 = P_{2x}L_1 \tag{2}$$

In the formula, $P_{1y}$ is the force perpendicular to the rod direction applied by component 2 to component 3, N; $L_2$ is the distance between $O_1$ and $O_2$, mm; $P_{2x}$ is the force perpendicular to the rod direction applied by the workpiece to component 3, N; $L_1$ is the distance between $O_2$ and point A, mm.

According to the force relationship and geometric relationship, the minimum thrust $P_{1,min}$ applied by the cylinder I-1-4-5 should meet the formula below:

$$P_{1,min} = \frac{F_{n,min}\cos(\theta_1 + \theta_2 - 90°)L_1}{NL_2\sin\theta_2} \tag{3}$$

In the formula, $\theta_1$ is the angle between component 1 and component 3, °; $\theta_2$ is the angle between component 2 and the vertical direction, °; N is the number of clamping devices.

Embodiment 2

Figure 22:
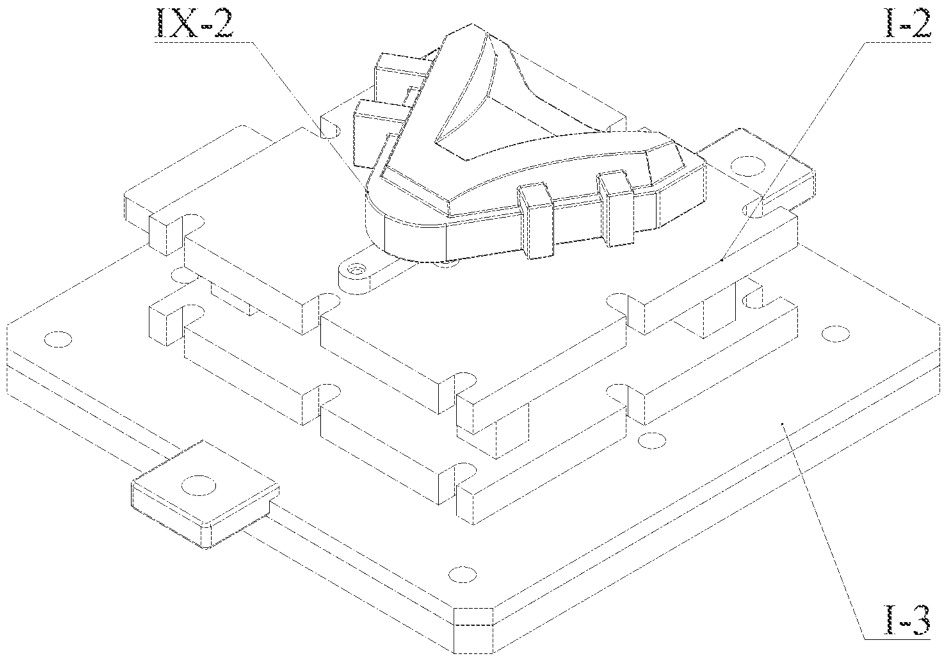
FIG. 22 is an axonometric diagram of an irregular cabin follow-up fixture in Embodiment 2 and Embodiment 3 of the present disclosure.
Figure 23:
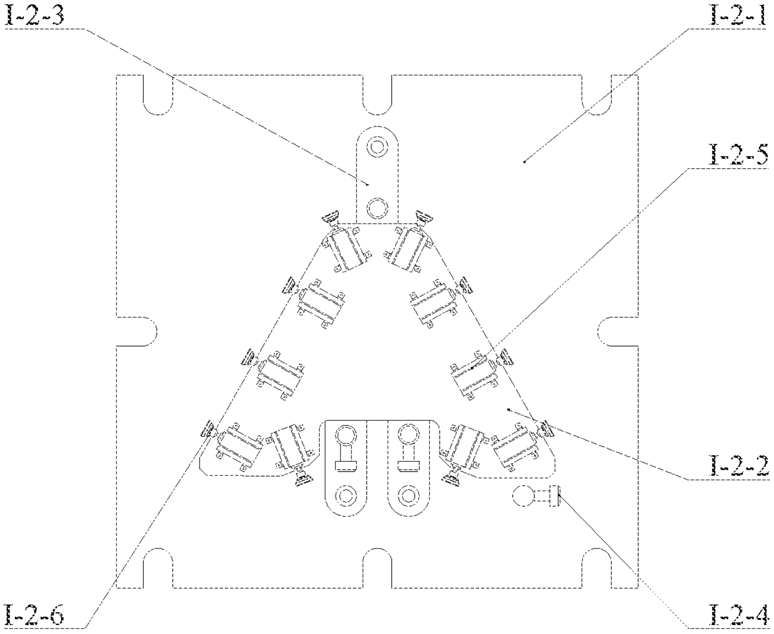
FIG. 23 is the upper view of the irregular cabin follow-up fixture in Embodiment 2 and Embodiment 3 of the present disclosure.
Figure 24:
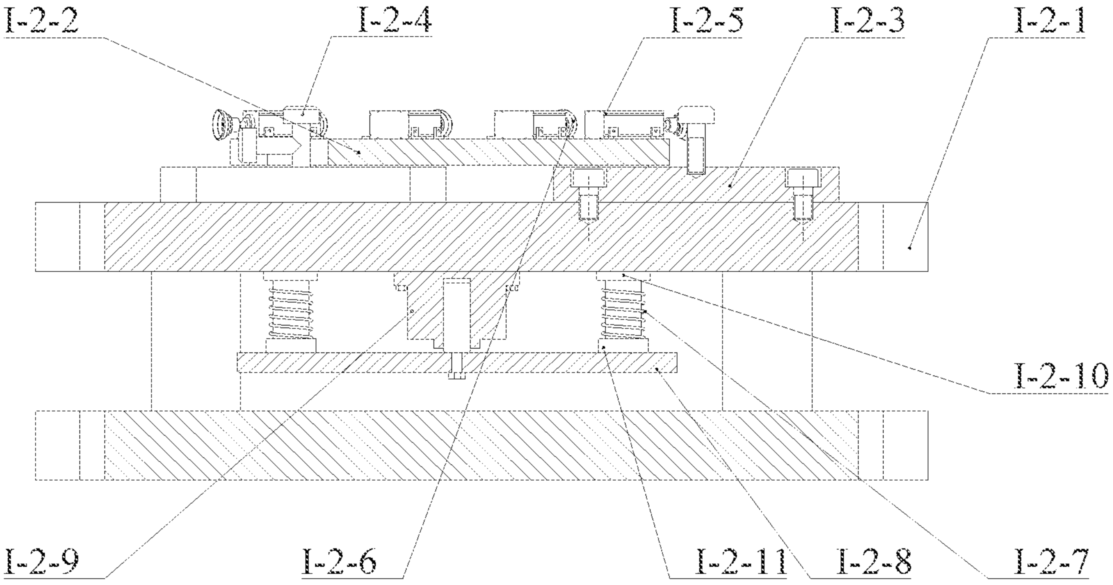
FIG. 24 is a sectional view of the irregular cabin follow-up fixture in Embodiment 2 and Embodiment 3 of the present disclosure.

In another typical embodiment of the present disclosure, as shown in FIG. 22 to FIG. 24, a machining and positioning system for aerospace irregular parts is provided.

Different from the machining and positioning system for the combustion chamber of the aerospace engine in Embodiment 1, in this embodiment, since a discrete intelligent production is carried out for the aerospace irregular cabin IX-2, an aerospace irregular cabin machining and positioning system is provided correspondingly, as shown in FIG. 21, consisting of a zero-point positioning system and an irregular cabin follow fixture I-2. The zero-point positioning system is installed in the machining center II for ensuring that the relative zero-point of the parts remains unchanged during transportation, and for clamping the follow fixture I-2. Universal pallets ensure unified transportation and positioning clamping methods for parts.

As shown in FIG. 23 and FIG. 24, the irregular cabin follow fixture I-2 includes: an universal pallet I-3, a base I-2-1, a floating mounting plate I-2-2, a mounting block I-2-3, a support nail I-2-4, a cylinder I-2-5, a suction cup I-2-6, a spring I-2-7, a mounting plate I-2-8, a main cylinder I-2-9, a flange I-2-10, and a shaft sleeve I-2-11. Wherein the base I-2-1 has two layers, and the lower layer is fixedly installed with the universal pallet I-3. The three mounting blocks I-2-3 are arranged in a triangular shape and fixed on the upper surface of the base I-2-1. Support nails I-2-4 are installed on the mounting block I-2-3 to achieve six-point positioning of the workpiece. Specifically, three support nails I-2-4 limit the rotation of the workpiece along the X-axis and Y-axis directions and the movement of the Z-axis, two support nails I-2-4 limit the movement of the workpiece along the X-axis and the Z-axis, and one support nail I-2-4 limits the movement of the workpiece along the Y-axis.

The floating mounting plate I-2-2 is trapezoidal in shape with a smaller overall size than the irregular cabin IX-2. Several cylinders I-2-5 are fixedly installed along the outer contour line of the upper surface of the floating mounting plate I-2-2. The cylinders I-2-5 are connected to the suction cup I-2-6 through a ball head, and the suction cup I-2-6 can adaptively fit to the inner surface of the irregular cabin IX-2 through the push of the cylinder. The lower surface of the floating mounting plate I-2-2 is equipped with a polished rod. The polished rod passes through the through-hole on the upper layer of the base I-2-1 and is fixedly connected to the mounting plate I-2-8, and the mounting plate I-2-8 is located in the middle of the upper and lower layers of base I-2-1. The flange I-2-10, the shaft sleeve I-2-11, and the spring I-2-7 are installed between the mounting plate I-2-8 and the lower surface of the upper layer of the bottom plate I-2-1. The flange I-2-10 is fixedly installed on the lower surface of the base I-2-1, and the shaft sleeve I-2-11 is fixedly installed on the upper surface of mounting plate I-2-8. The shaft sleeve I-2-11 is capable to move along the plain shaft of flange I-2-10. The spring I-2-7 is fixedly connected to the flange I-2-10 and the shaft sleeve I-2-11 at both ends. The middle of the lower surface of the base I-2-1 is fixedly installed with the main cylinder I-2-9, and the piston rod of the main cylinder I-2-9 is fixedly connected to the mounting plate I-2-8. The main cylinder I-2-9 drives the mounting plate I-2-9 to move downwards, thereby driving the floating mounting plate I-2-2 to move downwards and reset under the spring force.

The main positioning and clamping method of the irregular cabin follow fixture I-2 is based on the six-point positioning principle, using support nails I-2-4 to limit the workpiece in six degrees of freedom. The cylinder I-2-5 drives the suction cup I-2-6 to attach to the irregular cabin IX-2. Due to the design of the ball head mechanism between the piston rod of the cylinder I-2-5 and the suction cup I-2-6, the suction cup can fit the inner surface of the irregular cabin IX-2. After the suction cup is tightly fitted to the inner surface of the irregular cabin IX-2, it is attached to the inner surface of the irregular cabin IX-2 by suction. The main cylinder I-2-9 drives the mounting plate I-2-8 to move the floating mounting plate I-2-2 downwards. At this point, the irregular cabin IX-2 is tightly compressed by the vertical downward friction force perpendicular to the main positioning surface applied by the suction cup I-2-6.

Clamping Reliability Analysis:

$$F_c \geq \frac{F_{n,min}}{N\mu} - F_P \tag{4}$$

In the formula, $F_c$ is the suction force of the suction cup, N; $F_P$ is the cylinder thrust, N; $F_{n,min}$ is the minimum clamping force, N; N is the number of the suction cups, μ is the coefficient of friction;

$$F_c = 0.1 \times f \times A \times P \tag{5}$$

In the formula, f is the safety factor, A is the adsorption area of the suction cup, $cm^2$; P is the vacuum pressure, −KPa.

Embodiment 3

In another typical embodiment of the present disclosure, as shown in FIG. 1 to FIG. 24, a discrete intelligent production line is provided.

As shown in FIG. 1, the discrete intelligent production line includes: a machining center II, a circular conveyor platform III, a ground rail robot IV, an unloading conveyor platform V, a machine vision recognition device VI, a centralized tool changing system VII, a micro lubrication centralized supply system VIII, and a machining and positioning system for aerospace irregular parts I as shown in Embodiment 1 and Embodiment 2.

Wherein, four machining centers II are arranged in a rectangular shape, the machining and positioning system I is installed in the machining center II, the ground rail robot IV is installed on the rectangular centerline composed of four machining centers, the circular conveyor platform III is installed at the end of ground rail robot IV, and the machine visual recognition device VI is installed on the loading position of the circular conveyor platform III. Similarly, the unloading conveyor platform Vis installed and symmetrically arranged at the end of the ground rail robot IV. The centralized tool changing system VII is located above the machining centers II, and the micro lubrication centralized supply system VIII is connected to each machining center II.

The machining and positioning system I consists of a zero-point positioning device and a follow fixture. The zero-point positioning device is installed in the machining center II to ensure that the relative zero-point remains unchanged during the transportation of the workpiece. The follow fixture can ensure the positioning, processing, and transportation of diversified and complex irregular parts. The machining center II is mainly used for the processing and production of parts. Three-axis, four-axis, or five-axis machining centers can be selected according to specific machining needs, or they can be replaced with CNC lathes. The circular conveyor platform III is used for the transportation of parts and the adjustment of cycle time. And the circular conveyor platform III is equipped with a machine vision detection system VI, which is mainly used for part recognition. The conveying speed and the machining program of the machine tool can be adjusted according to the identified parts, selecting workpieces that meet the optimal processing route for feeding, thereby achieving discrete production of various irregular parts. The ground rail robot IV is used for conveying parts between the circular conveyor platform III and the machining center II. The ground rail robot IV is equipped with a temporary storage table that can move along the ground rail with the robot and temporarily store the parts to be processed for buffering and adjusting the production cycle time of the parts.

Figure 2:
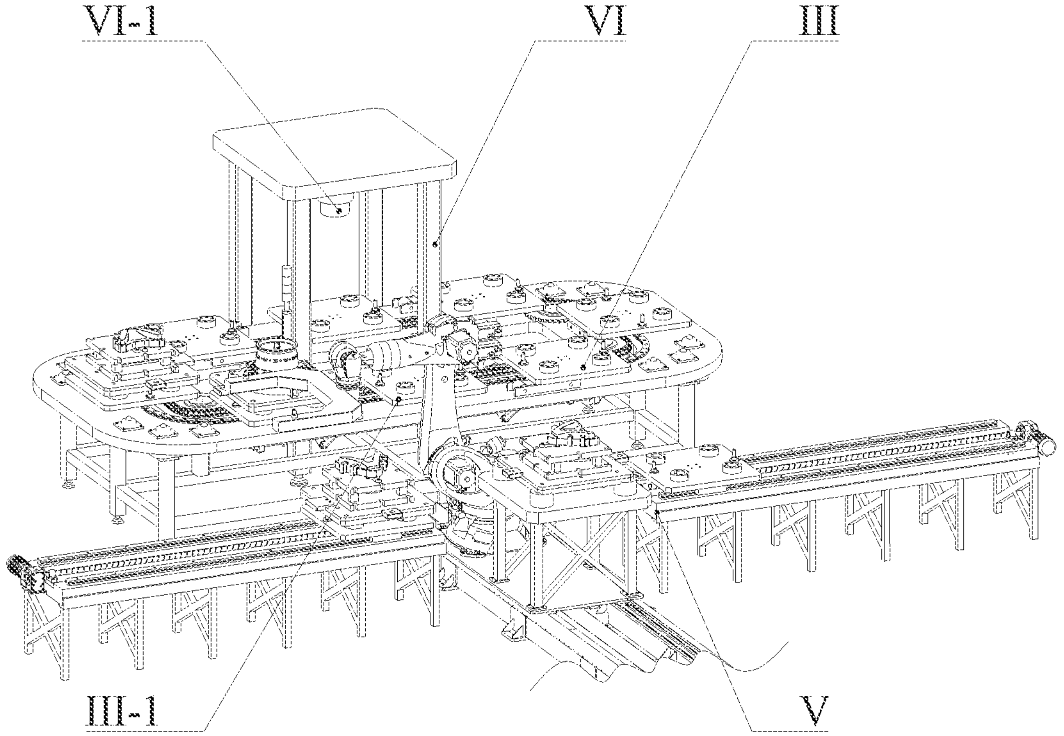
FIG. 2 is an axonometric diagram of a loading and unloading system of the discrete intelligent production line for aerospace irregular parts in Embodiment 3 of the present disclosure.

As shown in FIG. 2, the material conveying system of the production line is composed of the circular conveying platform III, the ground rail robot IV, the unloading conveying platform V, and the machine vision recognition device VI.

Figure 3:
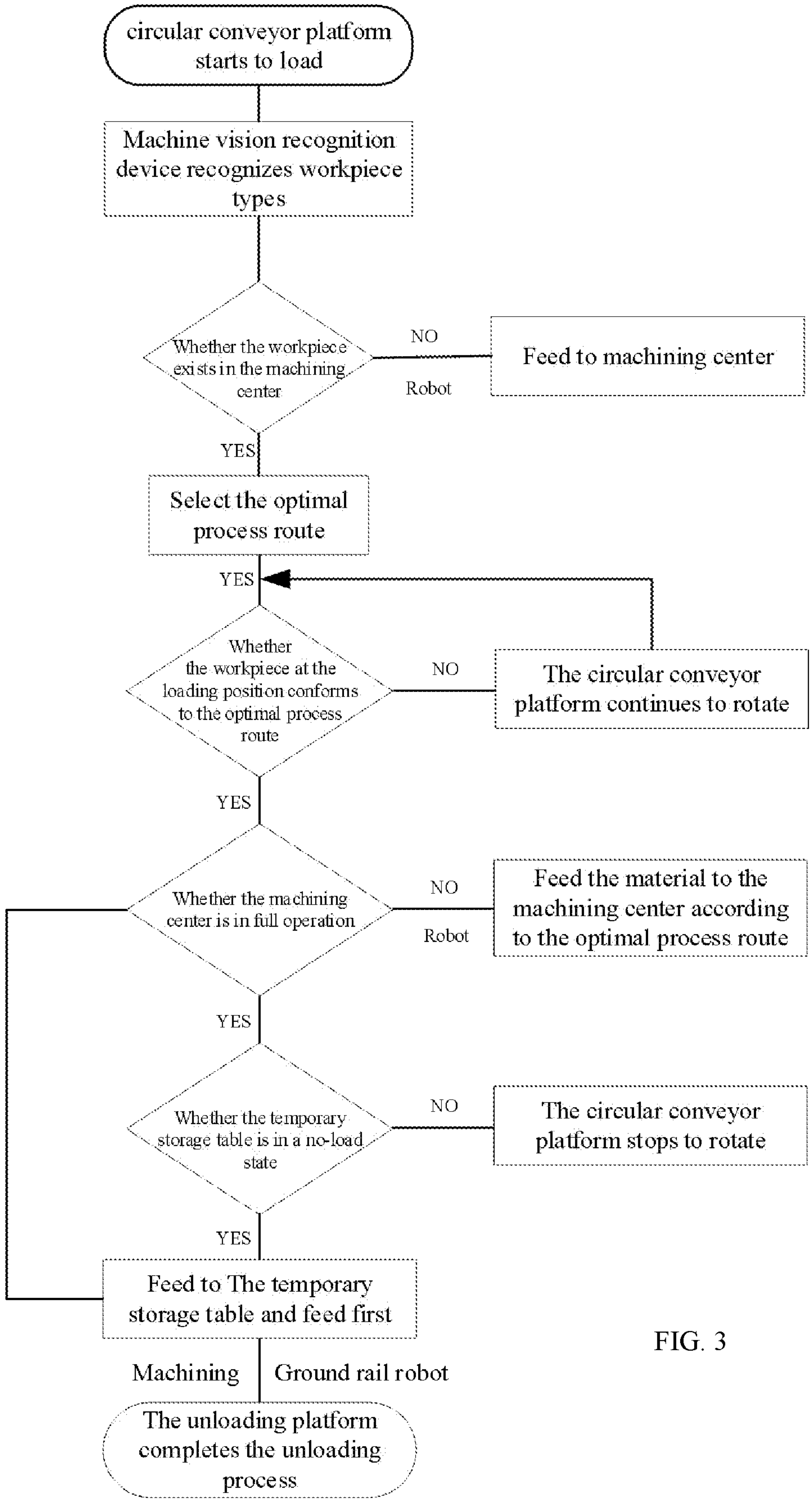
FIG. 3 is the operational process of the discrete intelligent production line for aerospace irregular parts in Embodiment 3 of the present disclosure.
Figure 4:
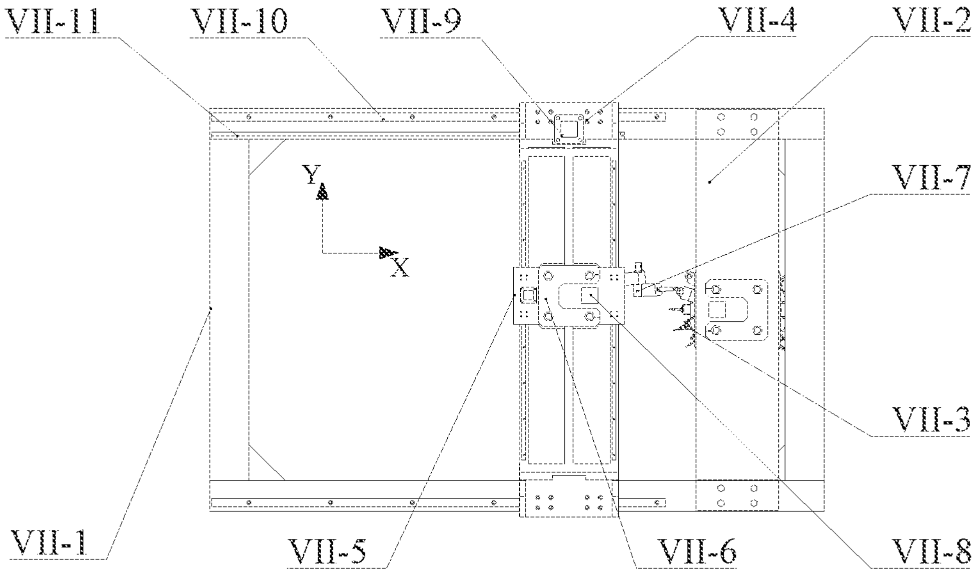
FIG. 4 is a top view of the centralized tool changing system in Embodiment 3 of the present disclosure.
Figure 5:
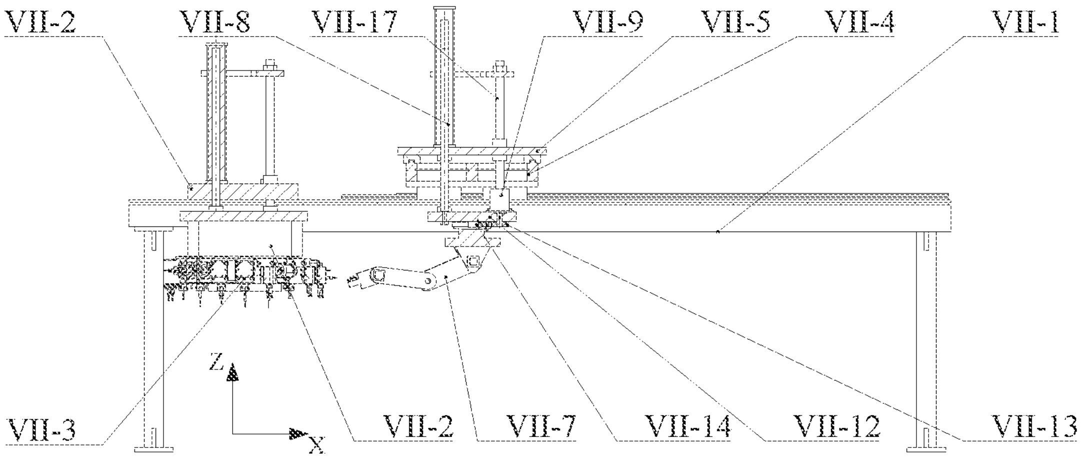
FIG. 5 is a sectional view of the centralized tool changing system in Embodiment 3 of the present disclosure.
Figure 6:
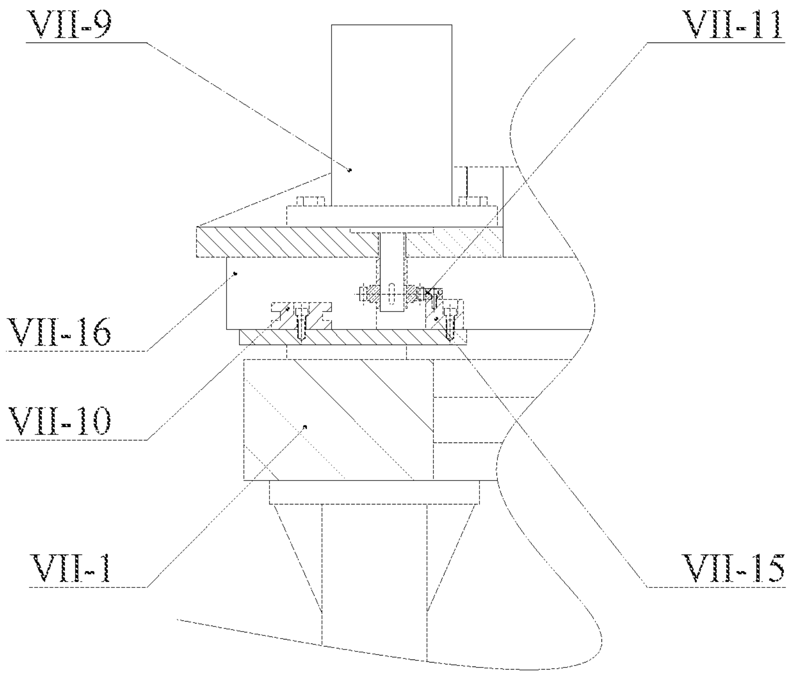
FIG. 6 is a partial sectional view of the centralized tool changing system in Embodiment 3 of the present disclosure.
Figure 7:
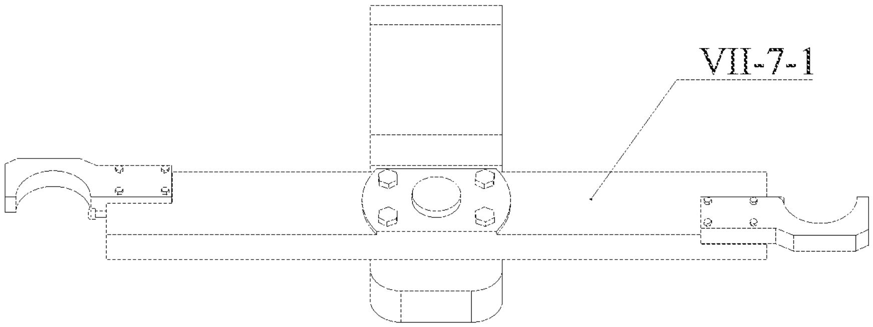
FIG. 7 is an axonometric diagram of the tool changing arm in Embodiment 3 of the present disclosure.

As shown in FIG. 2 and FIG. 3, the working method of the discrete intelligent production line is shown as following:

The circular conveyor platform III is used for loading, through the machine vision recognition device VI, the industrial camera VI-1, the workpiece is imaged and uploaded to the system for recognition of the workpiece type. When the workpiece is transported to the loading position III-1, the system determines the working status of machining center II:

(1) If all machining centers II are in a no-load state, the ground rail robot IV will transport the workpiece to the machining centers II and start processing.

(2) If not all of the machining centers II are in a no-load state or machining state, the system determines whether the current workpiece conforms to the optimal machining process route. If it does not conform to the optimal machining process route, the circular conveyor platform III continues to rotate until the workpiece at the loading position conforms to the optimal machining process route. If the current workpiece conforms to the optimal machining process route, the ground rail robot IV transports the workpiece to the machining centers II and begins machining.

(3) All machining centers II are in the processing state. If the workpiece at the loading position conforms to the optimal processing route, and if the temporary storage table of the ground rail robot IV is in a no-load state, the ground rail robot IV will transport the workpiece to the temporary storage table waiting for loading, and the loading priority is the highest.

If the temporary storage table of the ground rail robot IV is not in a no-load state, the circular conveyor platform III will stop running until the workpiece at the loading position is transported. After the workpiece processing is completed, it is transported by the ground rail robot to the unloading conveyor V to complete the unloading.

As shown in FIG. 4, FIG. 5, FIG. 6, and FIG. 7, the centralized tool changing system VII includes a support VII-1, a crossbeam mounting plate VII-2, a cutter head VII-3, an X-axis conveying device VII-4, a Y-axis conveying device VII-5, a Z-axis conveying device VII-6, a tool changing robot VII-7, a hydraulic cylinder VII-8, a servo motor VII-9, a linear guide rail VI-10, a rack VI-11, a floating mounting plate VII-12, a gear VII-13, a rolling support VII-14, a rack mounting plate VII-15, and a slider VII-16.

Wherein, the support VII-1 has a certain height, so that the device installed on the support has a certain height from the ground. The X-axis conveying device VII-4 is installed on the slider VII-16, and is driven by the servo motor VII-9 to move the gear-rack mechanism VII-11 in the X-direction along the guide rail VII-10.

Similarly, the Y-axis conveying device VII-5 uses the same driving and transmission methods to move along the guide rail VII-10 installed on the X-axis conveying device in the Y-axis direction. The guide rod VII-17 of the Z-axis conveying device VII-6 passes through the Y-axis conveying device VII-5, and is driven by the hydraulic cylinder VII-8 installed on the Y-axis conveying device to move the floating mounting plate VII-12 at the bottom of the guide rod VII-17 of the Z-axis conveying device VII-6 up and down.

The tool changing robot VII-7 is installed on the floating mounting plate VII-12. At this point, the tool changing robot VII-7 can move as a whole in the X-axis, Y-axis, and Z-axis directions. The floating mounting plate VII-12 is equipped with a servo motor VII-9. The main shaft of the servo motor VII-9 passes through the floating mounting plate VII-12 to drive the gear VII-13 to drive the rolling support VII-14 to rotate. The tool changing robot VII-7 is fixedly installed on the rolling support VII-14 through the mounting seat.

The tool changing robot VII-7 is a 6-axis robot, with each level of mechanical arm driven by servo motors. The tool changing robot VII-7 is fixedly installed with a dual station tool changing arm VII-7-1. The crossbeam mounting plate VII-2 is fixedly installed on one side of support VII-1, with the Z-axis conveying device VII-6 also installed in the middle position. The guide rod VII-17 of the Z-axis conveying device VII-6 passes through the crossbeam mounting plate VII-2, and the floating mounting plate VII-12 is driven by the hydraulic cylinder VII-8 to move along the Z-axis below the crossbeam mounting plate VII-2. The cutter head is fixedly installed on the floating mounting plate VII-12 and can be moved along the Z-axis direction under the drive of the hydraulic cylinder VII-8.

Specifically, the X-axis, Y-axis, and Z-axis conveying devices enable the tool changing robot VII-7 to move along the X-axis, Y-axis, and Z-axis directions as a whole, and the cutter head can move up and down in the Z-axis direction, achieving the replacement of tools inside the cutter head.

Figure 8:
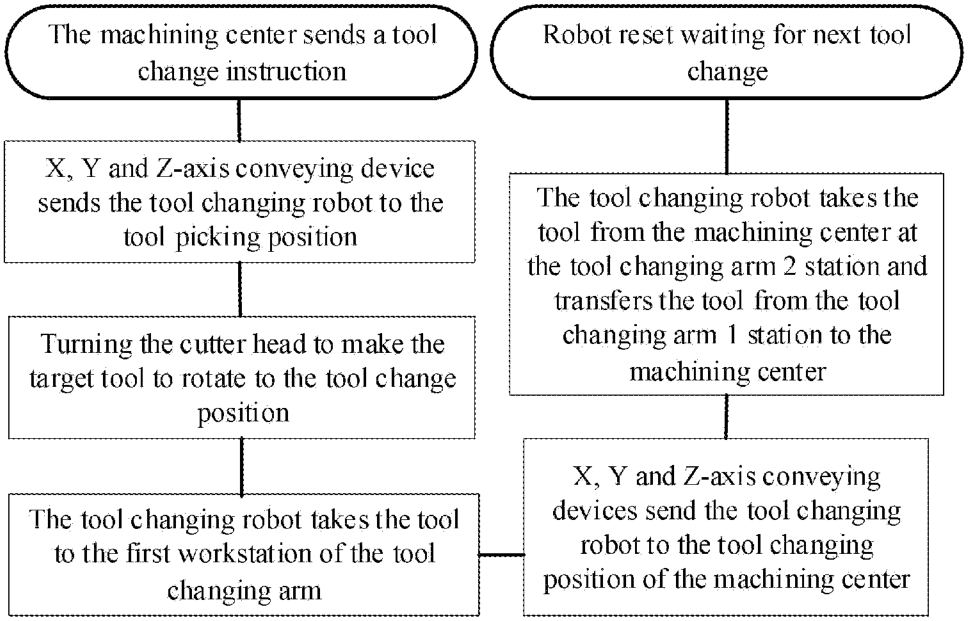
FIG. 8 is an operational process of the centralized tool changing system in Embodiment 3 of the present disclosure.

As shown in FIG. 8, the usage method of the centralized tool changing device VII is:

The machining center II sends a tool change instruction, and the system sends electrical signals to the servo motor VII-9 of the X-axis and Y-axis conveying devices and the hydraulic cylinder VII-8 of the Z-axis conveying device on the centralized tool change device VII, causing the tool changing robot VII-7 to reach the designated position;

The cutter head VII-3 rotates the target tool to the tool change position, and the tool changing robot VII-7 takes the tool and reaches the target machine tool through the X-axis, Y-axis, and Z-axis conveying devices;

The unloaded workstation of the tool changing arm VII-7-1 of the tool changing robot VII-7 removes the cutting tools from the machining center and installs the cutting tools to be replaced on the tool changing arm VII-7-1 onto the machining center;

After installation, reset the tool changing robot VII-7.

When the cutting tools in cutter head VII-3 need to be replaced, they can be uniformly replaced by lowering the height of the cutter head VII-3.

Figure 9:
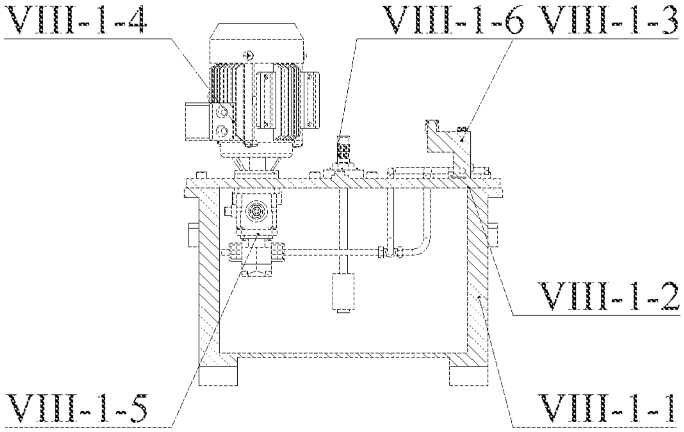
FIG. 9 is a sectional view of the centralized oil supply tank in Embodiment 3 of the present disclosure.
Figure 10:
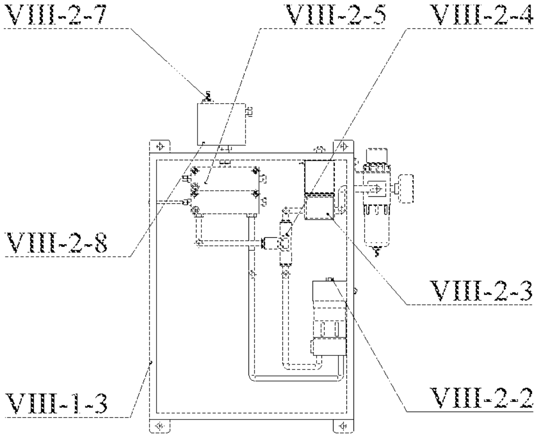
FIG. 10 is a front view of the micro lubrication device in Embodiment 3 of the present disclosure.

As shown in FIG. 9 and FIG. 10, the machining center II is equipped with a micro lubrication centralized supply system VIII, which includes a centralized oil supply tank VIII-1 and a micro lubrication device VIII-2. The micro lubrication oil supply tank consists of a tank VIII-1-1, a tank cover VIII-1-2, a solenoid valve VIII-1-3, a liquid level controller VIII-1-6, a hydraulic oil pump specific motor VIII-1-4, and a hydraulic oil pump VIII-1-5. The hydraulic oil pump VIII-1-5 is installed inside the tank VIII-1-1, and the specific motor VIII-1-4 of the hydraulic oil pump VIII-1-5 is installed on the tank cover VIII-1-2 and connected to the hydraulic oil pump VIII-1-5. The pipeline of the oil outlet of the hydraulic oil pump VIII-1-5 is connected to a four-way, connecting the solenoid valve VIII-1-3 in three separate paths, and then connecting to the oil cup VIII-2-6 of the micro lubrication device VIII-2.

The micro lubrication device VIII-2 includes a nozzle VIII-2-1, a pneumatic frequency generator VIII-2-2, a solenoid valve VIII-2-3, a three-way VIII-2-4, a micro pneumatic pump VIII-2-5, an oil cup VIII-2-6, a liquid level sensor VIII-2-7, and a tank VIII-2-8. The pipeline is divided into two paths through the solenoid valve VIII-2-3 and the three-way VIII-2-4. One path directly enters the nozzle VIII-2-1, and the other path passes through the pneumatic frequency generator VIII-2-2 and then enters the micro pneumatic pump VIII-2-5.

The solenoid valve VIII-2-3 is used to control the opening or closing of the gas path, the micro pneumatic pump VIII-2-5 is used to pump out a small amount of lubricating oil, and the pneumatic frequency generator VIII-2-2 is used to generate electrical signals to control the opening and closing of the micro pneumatic pump VIII-2-5. The liquid level sensor VII-2-7 is installed in the oil cup VI-2-6 to detect the oil level in the oil cup VII-2-6. If the liquid level in the oil cup VII-2-6 is too low, the computer controls the micro lubrication supply tank VII-2 to inject oil into the oil cup VII-2-6.

Figure 11:
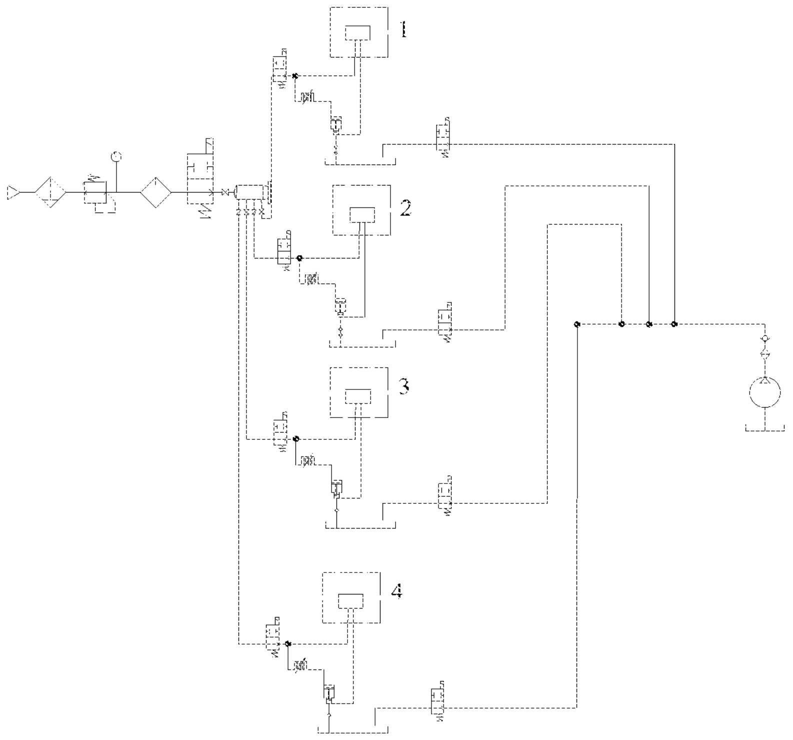
FIG. 11 is an oil and gas circuit diagram of the centralized oil supply system in Embodiment 3 of the present disclosure.

As shown in FIG. 11, the oil and gas circuits of the micro lubrication device VIII-2 and the centralized oil supply tank VIII-1 are respectively installed in the machining center II, wherein the executing elements 1, 2, 3, and 4 are nozzles VI-2-1. The compressed gas is filtered by the air source triplet (F.R.L) and enters the four micro lubrication devices VIII-2 through the solenoid valve and the air source distributor. The compressed gas is divided into two paths through the solenoid valve VIII-2-3. Part of the gas reaches nozzle VIII-2-1, while the other part passes through the pneumatic frequency generator VIII-2-2, thereby controlling the micro pneumatic pump VI-2-5 to output a small amount of lubricating oil pump to nozzle VIII-2-1. The compressed gas and a small amount of lubricating oil are mix into oil mist at in the nozzle VIII-2-1 and spray at high speed. The lubricating oil pumped out by the hydraulic oil pump VIII-1-5 from the tank VIII-1-1 passes through three solenoid valves VI-1-3 and enters the oil cups VIII-2-6 in the four micro lubrication devices VIII-2.

FIG. 12 to FIG. 21 show the machining and positioning system I corresponding to the aerospace engine combustion chamber of the casing IX-1. The machining and positioning system I applicable to casing IX-1 consists of a zero-point positioning system and a casing follow-up fixture I-1. The zero-point positioning system is installed in machining center II to ensure that the relative zero-point of the parts remains unchanged during transportation and is used for clamping the casing follow-up fixture I-1. Universal pallets ensure unified transportation and positioning clamping methods for parts. The specific content can be found in Embodiment 1, and will not be further elaborated here.

In this embodiment, in addition to the casing IX-1 of the aerospace engine combustion chamber, the discrete intelligent production of the aerospace irregular cabin IX-2 can also be carried out. Therefore, there is a corresponding aerospace irregular cabin machining and positioning system, as shown in FIG. 22 to FIG. 24, which is composed of a zero-point positioning system and an irregular cabin follow fixture I-2. The zero-point positioning system is installed in machining center II, which is configured to ensure that the relative zero-point of the parts remains unchanged during transportation and to clamp the follow fixture I-2. Universal pallets ensure unified transportation and positioning clamping methods for parts. The specific content can be found in Embodiment 2, and will not be further elaborated here.

The above is only preferred embodiments of the present disclosure and is not intended to limit it. For those skilled in the art, the present disclosure may have various modifications and variations. Any modifications, equivalent substitutions, improvements, etc. made within the spirit and principles of the present disclosure shall be included within the scope of the present disclosure.

What is claimed is:

1. A machining and positioning system for aerospace irregular parts, comprising:

a self-positioning device, wherein the self-positioning device comprises three ball heads connected to a base and arranged around a axis of the base, the three ball heads are respectively connected to a rotating frame through connecting rods, and the rotating frame drives the three ball heads to move back and forth radially along the base to abut an inner wall of a casing;

clamping devices, wherein a plurality of the clamping devices are arranged around the axis of the base, each clamping device comprises a press head connected to an opening and closing mechanism and a translation mechanism, the translation mechanism drives the press head to move radially along the base, and the press head is capable to press against an outer wall of the casing;

support devices, wherein the support device are connected to the base through a lifting device, and a plurality of the support devices are arranged around the axis of the base; each support device comprises an action mechanism and a support block, an output end of the action mechanism is connected to the support block through a universal joint, and the support block is attached with a plurality of piezoelectric plates on a side of the inner wall of the casing.

2. The machining and positioning system for aerospace irregular parts according to claim 1, wherein the base is provided with U-shaped positioning blocks that bear the casing, and three of the U-shaped positioning blocks are uniformly arranged around the axis of the base; along the circumferential direction, each ball head is located between two of the U-shaped positioning blocks, and the plurality of clamping devices are arranged between adjacent U-shaped positioning blocks.

3. The machining and positioning system for aerospace irregular parts according to claim 2, wherein the self-positioning device is located radially along the base on an inner side of the support device; the lifting device is capable to drive the support device to reciprocate lifting along the axis of the base, and the support device is arranged above the self-positioning device through the lifting device.

4. The machining and positioning system for aerospace irregular parts according to claim 1, wherein the rotating frame is triangular in shape, a center of the rotating frame is rotationally connected to a preset plain shaft on the base, a guide seat on the base maintains the movement direction of the ball heads, the connecting rods are connected to corner positions of the rotating frame, and the rotating frame is connected to a cylinder that drives the rotating frame to rotate around the plain shaft.

5. The machining and positioning system for aerospace irregular parts according to claim 1, wherein the translation mechanism comprises a mounting plate, a ball screw, a slider, and a servo motor; the slider is installed on the ball screw, an output end of the servo motor is connected to the ball screw, and the ball screw is rotationally installed on the mounting plate to drive the slider through rotation, so as to drive the press head and the opening and closing mechanism to move.

6. The machining and positioning system for aerospace irregular parts according to claim 5, wherein the press head is installed on the slider through a rotating seat, the opening and closing mechanism is a cylinder, one end of the cylinder is connected to the slider, and the other end of the cylinder is connected to the press head.

7. The machining and positioning system for aerospace irregular parts according to claim 1, wherein an adjusting hydraulic cylinder connected to the universal joint drives the universal joint to act, so as to change an orientation of the support blocks.

8. The machining and positioning system for aerospace irregular parts according to claim 1, wherein the plurality of piezoelectric plates are arranged on support blocks at intervals to obtain stress at different contact positions with the casing and adjust support force to counteract cutting radial force.

9. A machining and positioning system for aerospace irregular parts, comprising:

a base, wherein the base comprises an upper layer and a lower layer arranged apart; and a mounting plate is located between the upper layer and the lower layer and is connected to a bottom surface of the upper layer through a telescopic mechanism;

a floating mounting plate, wherein the floating mounting plate is trapezoidal in shape, with cylinders installed at intervals along a top edge of the floating mounting; output ends of the cylinders are provided with suction cups that are capable to abut and adsorb an inner wall of an irregular cabin; a bottom surface of the floating mounting plate is connected to the mounting plate after passing through the upper layer of the base through a plain rod;

a mounting block, wherein the mounting block is arranged between the upper layer of the base and the floating mounting plate, and is connected with support nails that abut against the irregular cabin.

* * * * *